United States Patent
Lee et al.

(10) Patent No.: US 10,374,804 B2
(45) Date of Patent: Aug. 6, 2019

(54) METHOD OF CONTROLLING ELECTRONIC DEVICE USING WEARABLE DEVICE AND METHOD OF OPERATING ELECTRONIC DEVICE

(71) Applicants: Seung-Ho Lee, Hwaseong-si (KR); Ki-Hyoun Kwon, Hwaseong-si (KR); Jerome Han, Daejeon (KR); Sung-Hoon Son, Suwon-si (KR)

(72) Inventors: Seung-Ho Lee, Hwaseong-si (KR); Ki-Hyoun Kwon, Hwaseong-si (KR); Jerome Han, Daejeon (KR); Sung-Hoon Son, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 424 days.

(21) Appl. No.: 14/837,531

(22) Filed: Aug. 27, 2015

(65) Prior Publication Data
US 2016/0080154 A1 Mar. 17, 2016

(30) Foreign Application Priority Data
Sep. 11, 2014 (KR) .......................... 10-2014-0120450

(51) Int. Cl.
| | |
|---|---|
| H04L 9/08 | (2006.01) |
| G06F 21/35 | (2013.01) |
| H04L 9/32 | (2006.01) |
| G06F 21/31 | (2013.01) |
| H04W 12/08 | (2009.01) |
| H04W 12/00 | (2009.01) |

(52) U.S. Cl.
CPC ............ *H04L 9/3234* (2013.01); *G06F 21/31* (2013.01); *G06F 21/35* (2013.01); *H04W 12/08* (2013.01); *G06F 2221/2111* (2013.01); *G06F 2221/2133* (2013.01); *G06F 2221/2139* (2013.01); *H04L 2209/805* (2013.01); *H04W 12/00508* (2019.01)

(58) Field of Classification Search
CPC ...... H04L 9/0872; H04L 63/107; G06F 21/30
USPC .................. 726/2–6; 713/180–185; 455/411
See application file for complete search history.

(56) References Cited

U.S. PATENT DOCUMENTS

| | | | |
|---|---|---|---|
| 7,257,374 B1 | 8/2007 | Creigh | |
| 8,125,458 B2 | 2/2012 | Keam | |
| 8,344,998 B2 | 1/2013 | Fitzgerald et al. | |
| 8,346,234 B2 | 1/2013 | Banga et al. | |
| 8,387,141 B1 | 2/2013 | Zhukov et al. | |

(Continued)

FOREIGN PATENT DOCUMENTS

KR 2014-0044689 A 4/2014

*Primary Examiner* — Lynn D Feild
*Assistant Examiner* — Viral S Lakhia
(74) *Attorney, Agent, or Firm* — Volentine, Whitt & Francos, PLLC

(57) ABSTRACT

In a method of controlling an electronic device using a wearable device, the electronic device is paired with the wearable device. A cryptographic key, which corresponds to the electronic device, is stored in a secure storage device included in the wearable device. A distance between the wearable device and the electronic device is estimated by the wearable device. An unlock signal including the cryptographic key, which is stored in the secure storage device, is transmitted from the wearable device to the electronic device when the estimated distance is smaller than a threshold distance. The electronic device is unlocked based on the unlock signal.

19 Claims, 18 Drawing Sheets

(56) References Cited

U.S. PATENT DOCUMENTS

| | | | |
|---|---|---|---|
| 8,542,833 B2 | 9/2013 | Devol et al. | |
| 9,189,901 B2* | 11/2015 | Agrafioti | G06F 21/40 |
| 9,317,155 B2* | 4/2016 | Magi | G06F 1/1652 |
| 9,398,007 B1* | 7/2016 | Wegener | H04L 63/0861 |
| 9,641,526 B1* | 5/2017 | Gopalakrishnan | H04L 63/0876 |
| 9,674,707 B2* | 6/2017 | Boettcher | H04M 1/67 |
| 9,684,778 B2* | 6/2017 | Tharappel | G06F 21/32 |
| 10,039,003 B2* | 7/2018 | Maragoudakis | H04M 1/67 |
| 2009/0096573 A1 | 4/2009 | Graessley | |
| 2010/0030695 A1 | 2/2010 | Chen et al. | |
| 2011/0167262 A1* | 7/2011 | Ross | H04W 12/06 713/168 |
| 2013/0176107 A1 | 7/2013 | Dumas et al. | |
| 2013/0285836 A1 | 10/2013 | Proud | |
| 2014/0062892 A1 | 3/2014 | Dickinson et al. | |
| 2014/0085048 A1 | 3/2014 | Hadizad | |
| 2014/0249943 A1* | 9/2014 | Hicks | G06Q 20/204 705/17 |
| 2014/0282878 A1* | 9/2014 | Ignatchenko | H04L 63/08 726/3 |
| 2014/0325220 A1* | 10/2014 | Tunnell | G06F 21/00 713/168 |
| 2014/0337621 A1* | 11/2014 | Nakhimov | G06F 1/163 713/168 |
| 2014/0380445 A1* | 12/2014 | Tunnell | G06F 21/00 726/7 |
| 2015/0031348 A1* | 1/2015 | Lee | H04B 1/385 455/418 |
| 2015/0058942 A1* | 2/2015 | Dermu | G06F 21/445 726/6 |
| 2015/0379255 A1* | 12/2015 | Konanur | G06F 21/35 726/19 |
| 2016/0037345 A1* | 2/2016 | Margadoudakis | H04L 63/0853 455/411 |
| 2016/0037346 A1* | 2/2016 | Boettcher | H04M 1/72519 455/411 |
| 2016/0044445 A1* | 2/2016 | Hu | H04B 5/00 455/41.3 |
| 2016/0070932 A1* | 3/2016 | Zimmer | G06F 21/72 713/192 |
| 2016/0072799 A1* | 3/2016 | Hu | G06F 21/32 455/411 |
| 2016/0314468 A1* | 10/2016 | Smith | G07F 7/1041 |

* cited by examiner

| ID_F | CK_F |
|------|------|
| ID1  | CK1  |
| ID2  | CK2  |
| ⋮    | ⋮    |
| IDn  | CKn  |

| ID_F | CK_F | TD_F |
|------|------|------|
| ID1  | CK1  | TD1  |
| ID2  | CK2  | TD2  |
| ⋮    | ⋮    | ⋮    |
| IDn  | CKn  | TDn  |

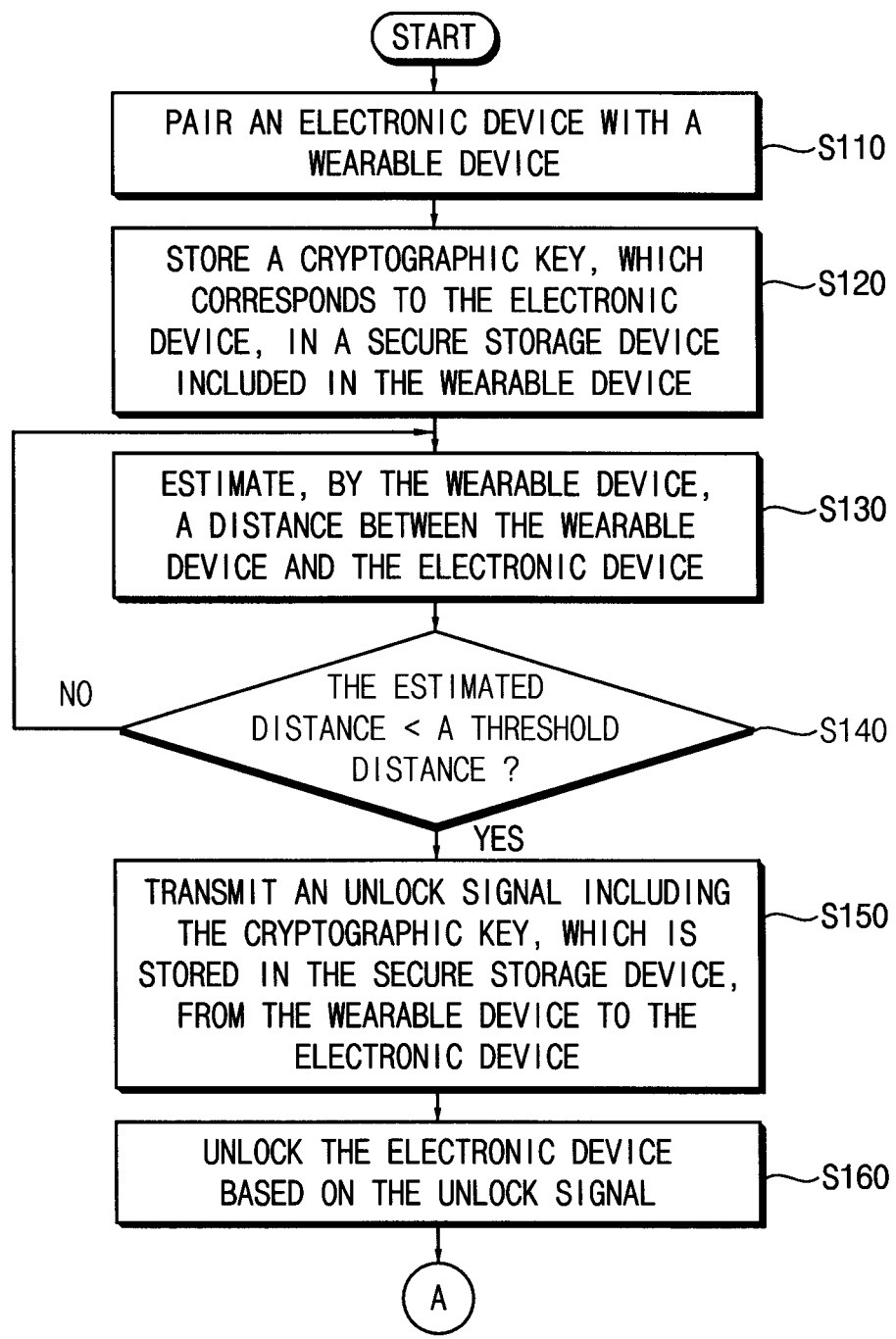

| ADDR_F |
|--------|
| ADDR1  |
| ADDR2  |
| ⋮      |
| ADDRm  |

| ID_F | ADDR_F | UN_F | PW_F |
|------|--------|------|------|
| ID1  | ADDR1-1 | UN1-1 | PW1-1 |
| ID1  | ADDR1-2 | UN1-2 | PW1-2 |
| ID2  | ADDR2-1 | UN2-1 | PW2-1 |
| ⋮ | ⋮ | ⋮ | ⋮ |
| IDn  | ADDRn-1 | UNn-1 | PWn-1 |

METHOD OF CONTROLLING ELECTRONIC DEVICE USING WEARABLE DEVICE AND METHOD OF OPERATING ELECTRONIC DEVICE

CROSS-REFERENCE TO RELATED APPLICATION(S)

This application claims priority under 35 USC § 119 to Korean Patent Application No. 10-2014-0120450, filed on Sep. 11, 2014 in the Korean Intellectual Property Office (KIPO), the contents of which are herein incorporated by reference in their entirety.

BACKGROUND

1. Technical Field

Example embodiments relate to a control of an electronic device, and more particularly to a method of controlling an electronic device using a wearable device.

2. Description of the Related Art

Generally, wearable devices are used with mobile devices, such as smart phones, to assist operation of the mobile devices.

Recently, a technique of controlling a mobile device with a wearable device has been developed to increase the convenience to a user of the mobile device.

However, if one of the mobile device and the wearable device gets out of control of a user, the mobile device may be used by an unauthorized person such that secure data stored in the mobile device may be leaked or compromised.

SUMMARY

Some example embodiments are directed to providing a method of controlling an electronic device using a wearable device that effectively increases convenience of a user without incurring a security problem.

Some example embodiments are directed to providing a method of operating an electronic device using a wearable device.

In a method of controlling an electronic device using a wearable device, the electronic device is paired with the wearable device. A cryptographic key, which corresponds to the electronic device, is stored in a secure storage device included in the wearable device. A distance between the wearable device and the electronic device is estimated by the wearable device. An unlock signal including the cryptographic key, which is stored in the secure storage device, is transmitted from the wearable device to the electronic device when the estimated distance is smaller than a threshold distance. The electronic device is unlocked based on the unlock signal.

In example embodiments, storing the cryptographic key, which corresponds to the electronic device, in the secure storage device included in the wearable device may include receiving, by the wearable device, the cryptographic key from the electronic device, and storing, by the wearable device, the cryptographic key in the secure storage device in association with a unique number or identifier of the electronic device.

In example embodiments, storing the cryptographic key, which corresponds to the electronic device, in the secure storage device included in the wearable device may include receiving, by the wearable device, the cryptographic key through a user interface of the wearable device, and storing, by the wearable device, the cryptographic key in the secure storage device in association with a unique number or identifier of the electronic device.

In example embodiments, the secure storage device may be accessed by only a predetermined application operating on a trusted execution environment (TEE).

In example embodiments, estimating, by the wearable device, the distance between the wearable device and the electronic device may include transmitting a detection signal from the wearable device to the electronic device, transmitting a response signal from the electronic device to the wearable device in response to the detection signal, and calculating, by the wearable device, the estimated distance based on an intensity of the response signal.

The wearable device may transmit the detection signal to the electronic device periodically.

The wearable device may transmit the detection signal to the electronic device in response to a detection start signal.

The wearable device may receive the detection start signal through a user interface of the wearable device.

The wearable device may generate the detection start signal by detecting a movement of the wearable device using a sensor included in the wearable device.

In example embodiments, unlocking the electronic device based on the unlock signal may include comparing, by the electronic device, the cryptographic key included in the unlock signal with an unlock key stored in the electronic device, and unlocking, by the electronic device, a lock system of the electronic device when the cryptographic key included in the unlock signal is identical to the unlock key stored in the electronic device.

In example embodiments, the threshold distance may be stored in the secure storage device.

In example embodiments, the wearable device may receive the threshold distance through a user interface of the wearable device, and store the threshold distance in the secure storage device in association with a unique number or identifier of the electronic device.

In example embodiments, the electronic device may receive an automatic unlock flag through a user interface of the electronic device, and internally store the automatic unlock flag. When the electronic device receives the unlock signal from the wearable device, the electronic device may unlock a lock system of the electronic device based on the unlock signal if the automatic unlock flag has a first value, and maintain the lock system of the electronic device in a locked state if the automatic unlock flag has a second value.

In example embodiments, the method of controlling the electronic device using the wearable device may further comprise estimating, by the wearable device, the distance between the wearable device and the electronic device periodically after the wearable device transmits the unlock signal to the electronic device, transmitting a lock signal from the wearable device to the electronic device when the estimated distance is equal to or greater than the threshold distance, and locking the electronic device based on the lock signal.

The method of controlling the electronic device using the wearable device may further comprise changing an operation mode of the electronic device to a low power idle mode in response to the lock signal.

The method of controlling the electronic device using the wearable device may further comprise connecting, by the electronic device, to a website corresponding to a first address, determining, by the electronic device, whether the first address is stored in an address table, which is internally stored in the electronic device, and logging on, by the electronic device, to the website corresponding to the first address automatically using a user name and a password, which are received from the wearable device, when the first address is stored in the address table.

Logging on, by the electronic device, to the website corresponding to the first address automatically using the user name and the password, which are received from the wearable device, when the first address is stored in the address table may include transmitting the first address from the electronic device to the wearable device, reading, by the wearable device, the user name and the password, which correspond to the first address, from the secure storage device when the estimated distance is smaller than the threshold distance, transmitting the user name and the password, which are read from the secure storage device, from the wearable device to the electronic device, and logging on, by the electronic device, to the website corresponding to the first address automatically using the user name and the password received from the wearable device.

The method of controlling the electronic device using the wearable device may further comprise logging on, by the electronic device, to the website corresponding to the first address using a user name and a password, which are received through a user interface of the electronic device, when the first address is not stored in the address table, transmitting the user name and the password, which are received through the user interface of the electronic device, together with the first address from the electronic device to the wearable device, storing, by the electronic device, the first address in the address table, and storing, by the wearable device, the first address, the user name and the password, which are received from the electronic device, in the secure storage device in association with a unique number of the electronic device.

The electronic device may log off from the website corresponding to the first address automatically when the electronic device receives the lock signal from the wearable device after the electronic device logs on to the website corresponding to the first address automatically using the user name and the password received from the wearable device.

In example embodiments, transmitting the unlock signal including the cryptographic key, which is stored in the secure storage device, from the wearable device to the electronic device when the estimated distance is smaller than the threshold distance may include determining, by the wearable device, a movement pattern of the wearable device using a sensor included in the wearable device, and transmitting the unlock signal including the cryptographic key, which is stored in the secure storage device, from the wearable device to the electronic device based on a reference movement pattern, which is stored in the secure storage device, and the determined movement pattern.

In example embodiments, transmitting the unlock signal including the cryptographic key, which is stored in the secure storage device, from the wearable device to the electronic device when the estimated distance is smaller than the threshold distance may include generating, by the wearable device, a first sensing data by detecting a movement of the wearable device using a sensor included in the wearable device, transmitting a sense request signal from the wearable device to the electronic device, generating, by the electronic device, a second sensing data in response to the sense request signal by detecting a movement of the electronic device using a sensor included in the electronic device, transmitting the second sensing data from the electronic device to the wearable device, determining, by the wearable device, a movement pattern of a user based on a combination of the first sensing data and the second sensing data, and transmitting the unlock signal including the cryptographic key, which is stored in the secure storage device, from the wearable device to the electronic device based on a reference movement pattern, which is stored in the secure storage device, and the determined movement pattern.

In example embodiments, the electronic device may be paired with the wearable device using Bluetooth.

In example embodiments, the wearable device may correspond to one of a smart watch, smart glasses, a smart necklace and a smart band.

In example embodiments, the electronic device may correspond to a mobile device.

In example embodiments, the electronic device may correspond to a home appliance.

In a method of operating an electronic device, the electronic device is paired with a wearable device. An unlock signal is received from the wearable device when a distance between the wearable device and the electronic device is smaller than a threshold distance. A lock system of the electronic device is unlocked based on the unlock signal.

In example embodiments, the method of operating an electronic device may further comprise receiving a lock signal from the wearable device when the distance between the wearable device and the electronic device is equal to or greater than the threshold distance, and locking the lock system of the electronic device based on the lock signal.

BRIEF DESCRIPTION OF THE DRAWINGS

Illustrative, non-limiting example embodiments will be more clearly understood from the following detailed description in conjunction with the accompanying drawings.

FIG. 8 is a diagram illustrating an example of a control information table stored in a secure storage device included in the wearable device of FIG. 3.

FIG. 10 is a diagram illustrating an example of a control information table stored in a secure storage device included in the wearable device of FIG. 3.

FIGS. 18A and 18B is a flow chart illustrating a method of controlling an electronic device using a wearable device according to example embodiments.

FIG. 19 is a diagram illustrating an example of an address table stored in a storage device included in the electronic device of FIG. 2.

FIG. 20 is a diagram illustrating an example of a log-on information table stored in a secure storage device included in the wearable device of FIG. 3.

DETAILED DESCRIPTION OF THE EMBODIMENTS

Figure 1:
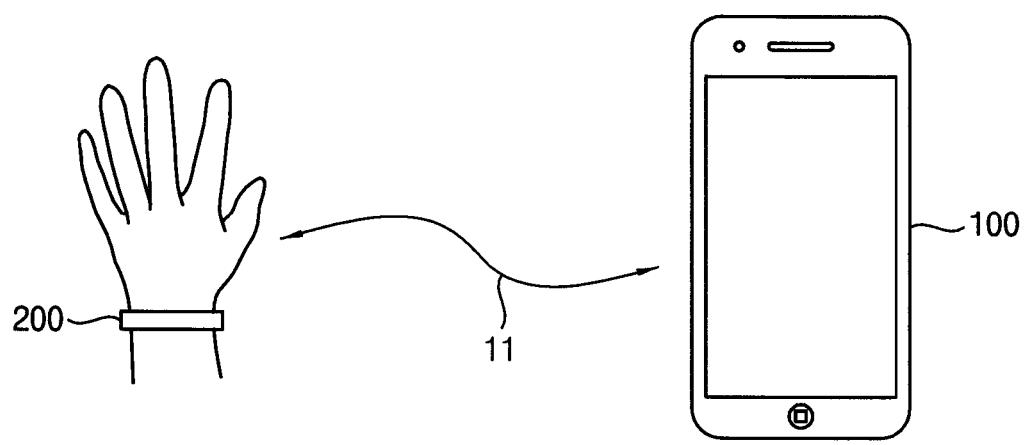
FIG. 1 is a diagram illustrating a communication system according to example embodiments.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

FIG. 1 is a diagram illustrating a communication system according to example embodiments. Referring to FIG. 1, a communication system 10 includes at least one electronic device 100 and a wearable device 200. The electronic device 100 and the wearable device 200 communicate with each other through a wired or wireless communication link 11.

In FIG. 1, the electronic device 100 is illustrated as a smart phone. However, embodiments are not limited thereto, and the electronic device 100 may be any mobile device, such as a tablet computer, a mobile phone, a personal digital assistant (PDA), a portable multimedia player (PMP), a digital camera, a laptop computer, a music player, a portable game console, etc.

In FIG. 1, the wearable device 200 is illustrated as a smart watch. However, embodiments are not limited thereto, and the wearable device 200 may be any device that is able to be worn by a user, such as smart glasses, a smart necklace, a smart band, etc.

As will be described later, the wearable device 200 controls an operation of the electronic device 100 when the electronic device 100 is within a predetermined distance from the wearable device 200.

In FIG. 1, the communication system 10 includes one electronic device 100 as an example. However, according to example embodiments, the communication system 10 may include a plurality of electronic devices 100. In this case, the wearable device 200 may control an operation of each of the plurality of electronic devices 100 when each of the plurality of electronic devices 100 is within a predetermined distance from the wearable device 200.

Figure 2:
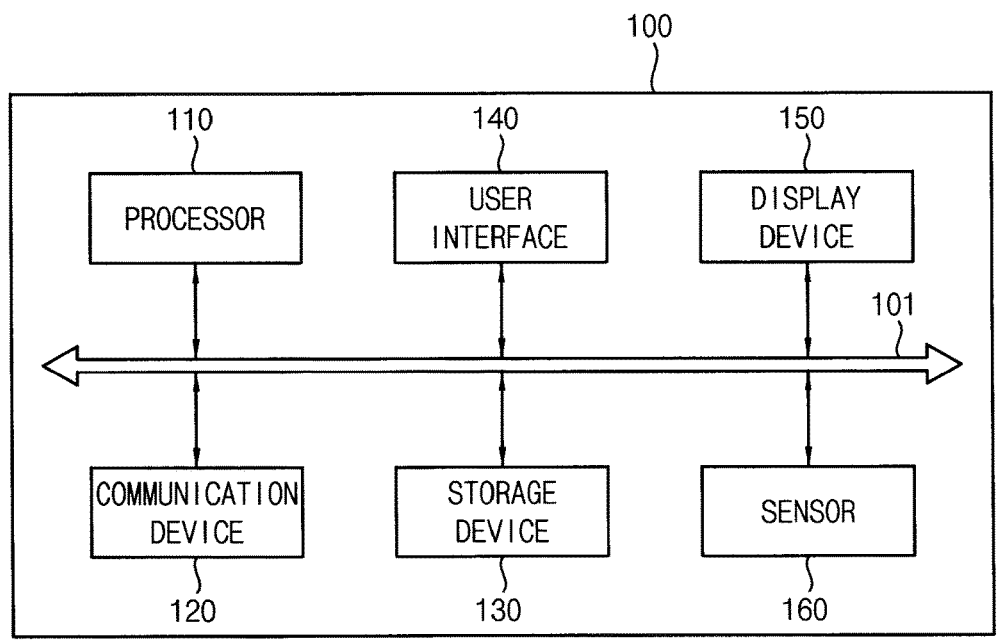
FIG. 2 is a block diagram illustrating an example of an electronic device included in the communication system of FIG. 1.

FIG. 2 is a block diagram illustrating an example of an electronic device included in the communication system of FIG. 1. Referring to FIG. 2, an electronic device 100 may include a processor 110, a communication device 120, a storage device 130, a user interface 140, a display device 150 and a sensor 160. The processor 110, the communication device 120, the storage device 130, the user interface 140, the display device 150 and the sensor 160 included in the electronic device 100 may communicate with each other via an internal bus 101.

The processor 110 may control overall operations of the electronic device 100. The processor 110 may execute applications, such as a web browser, a game application, a video player, etc. In some embodiments, the processor 110 may include a single core or multiple cores. For example, the processor 110 may be a multi-core processor, such as a dual-core processor, a quad-core processor, a hexa-core processor, etc. The processor 110 may include an internal or external cache memory.

The communication device 120 may communicate with the wearable device 200. For example, the communication device 120 may communicate with the wearable device 200 through a wireless communication, such as Bluetooth, a near field communication (NFC), a radio frequency identification (RFID), etc., or through a wired communication, such as a serial communication, a universal serial bus (USB) communication, etc.

The storage device 130 may store various data required for an operation of the electronic device 100. For example, the storage device 130 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 140 may include at least one input device, such as a keypad, a touch screen, an input button, etc.

The display device 150 may show information to a user by displaying an image data provided by the processor 110. For example, the display device 150 may include a liquid crystal display (LCD) device, an organic light emitting diode (OLED) device, etc.

The sensor 160 may detect various kinds of physical quantities related with a movement of the electronic device 100. For example, the sensor 160 may detect an angle of the electronic device 100 relative to a horizontal plane, a velocity of the electronic device 100, an acceleration of the electronic device 100, etc. In some example embodiments, the sensor 160 may include a gyro sensor, a terrestrial magnetism sensor, an acceleration sensor, etc.

Figure 3:
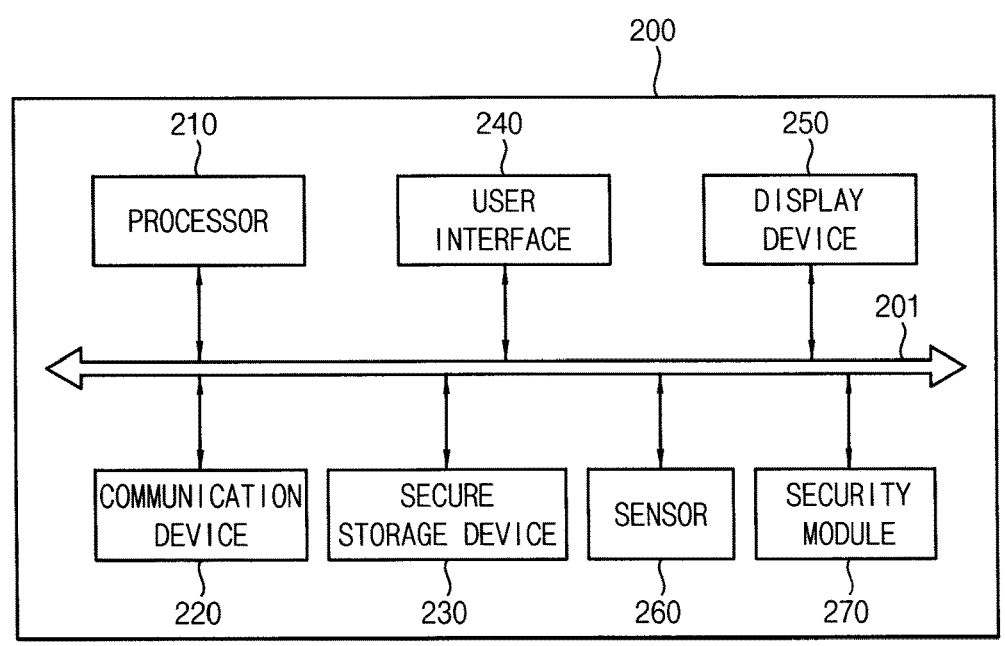
FIG. 3 is a block diagram illustrating an example of a wearable device included in the communication system of FIG. 1.

FIG. 3 is a block diagram illustrating an example of a wearable device included in the communication system of FIG. 1. Referring to FIG. 3, a wearable device 200 may include a processor 210, a communication device 220, a secure storage device 230, a user interface 240, a display device 250, a sensor 260 and a security module 270.

The processor 210, the communication device 220, the secure storage device 230, the user interface 240, the display device 250, the sensor 260 and the security module 270 included in the wearable device 200 may communicate with each other via an internal bus 201.

The processor 210 may control overall operations of the wearable device 200. In some embodiments, the processor 210 may include a single core or multiple cores. For example, the processor 210 may be a multi-core processor, such as a dual-core processor, a quad-core processor, a hexa-core processor, etc. The processor 210 may include an internal or external cache memory.

The communication device 220 may communicate with the electronic device 100. For example, the communication device 220 may communicate with the electronic device 100 through a wireless communication, such as Bluetooth, a near field communication (NFC), a radio frequency identification (RFID), etc., or through a wired communication, such as a serial communication, a universal serial bus (USB) communication, etc.

The secure storage device 230 may store various data required for a control of the electronic device 100. For example, the secure storage device 230 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The security module 270 may encrypt output data received from the processor 210 and provide the encrypted output data to the communication device 220. The security module 270 may decrypt input data received from the communication device 220 and provide the decrypted input data to the processor 210. Therefore, the security module 270 may provide a secure channel between the electronic device 100 and the wearable device 200. In some example embodiments, the security module 270 may be implemented as software, hardware, or a combination of software and hardware.

In some example embodiments, the secure storage device 230 and the security module 270 may operate on a trusted execution environment (TEE) to increase a security level of a communication between the wearable device 200 and the electronic device 100.

Figure 4:
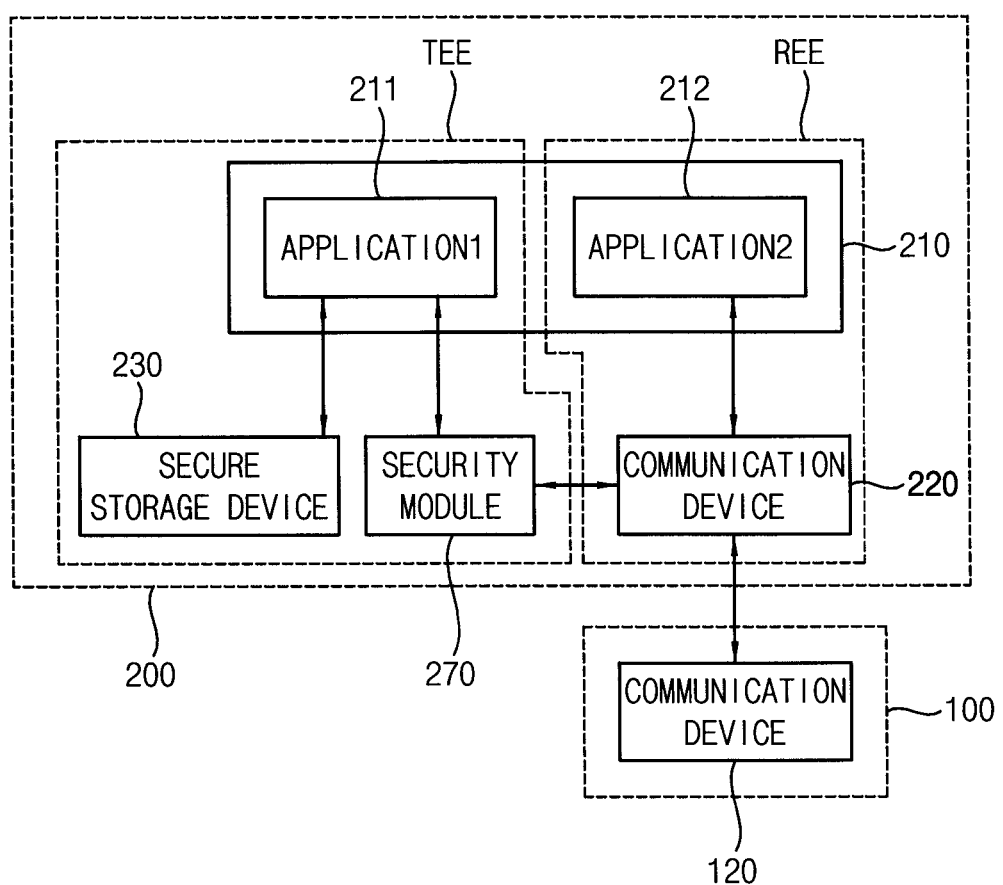
FIG. 4 is a block diagram for describing a trusted execution environment (TEE) of the wearable device of FIG. 3.

FIG. 4 is a block diagram for describing a trusted execution environment (TEE) of the wearable device of FIG. 3. As illustrated in FIG. 4, the wearable device 200 may include the trusted execution environment (TEE) and a rich operating system execution environment (REE).

A first application 211 may operate on the trusted execution environment (TEE) of the processor 210, and a second application 212 may operate on the rich operating system execution environment (REE) of the processor 210. For example, the first application 211 may correspond to a predetermined application, which operates on a secure operating system, for controlling an operation of the electronic device 100, and the second application 212 may correspond to a general application, which operates on a normal operating system such as Android.

The second application 212, which operates on the rich operating system execution environment (REE), may directly communicate with the electronic device 100 through the communication device 220.

On the other hand, the first application 211, which operates on the trusted execution environment (TEE), may provide output data to the security module 270, the security module 270 may encrypt the output data received from the first application 211 and provide the encrypted output data to the communication device 220, and the communication device 220 may transmit the encrypted output data to the electronic device 100. Similarly, the communication device 220 may receive input data from the electronic device 100 and provide the input data to the security module 270, the security module 270 may decrypt the input data received from the communication device 220 and provide the decrypted input data to the first application 211, and the first application 211 may store the decrypted input data in the secure storage device 230.

Since the secure storage device 230 and the security module 270 operate on the trusted execution environment (TEE), the secure storage device 230 and the security module 270 may be accessed by only a predetermined application operating on the trusted execution environment (TEE), such as the first application 211. An application operating on the rich operating system execution environment (REE), such as the second application 212, may not be able to access the secure storage device 230 and the security module 270. Therefore, a security level may increase in controlling the electronic device 100 using the wearable device 200.

Referring again to FIG. 3, the user interface 240 may include at least one input device, such as a keypad, a touch screen, an input button, etc.

The display device 250 may show information to a user by displaying an image data provided by the processor 210. For example, the display device 250 may include a liquid crystal display (LCD) device, an organic light emitting diode (OLED) device, etc.

The sensor 260 may detect various kinds of physical quantities or parameters related with movement of the wearable device 200. For example, the sensor 260 may detect an angle of the wearable device 200 relative to a horizontal plane, a velocity of the wearable device 200, an acceleration of the wearable device 200, etc. In some example embodiments, the sensor 260 may include a gyro sensor, a terrestrial magnetism sensor, an acceleration sensor, etc.

Figure 5:
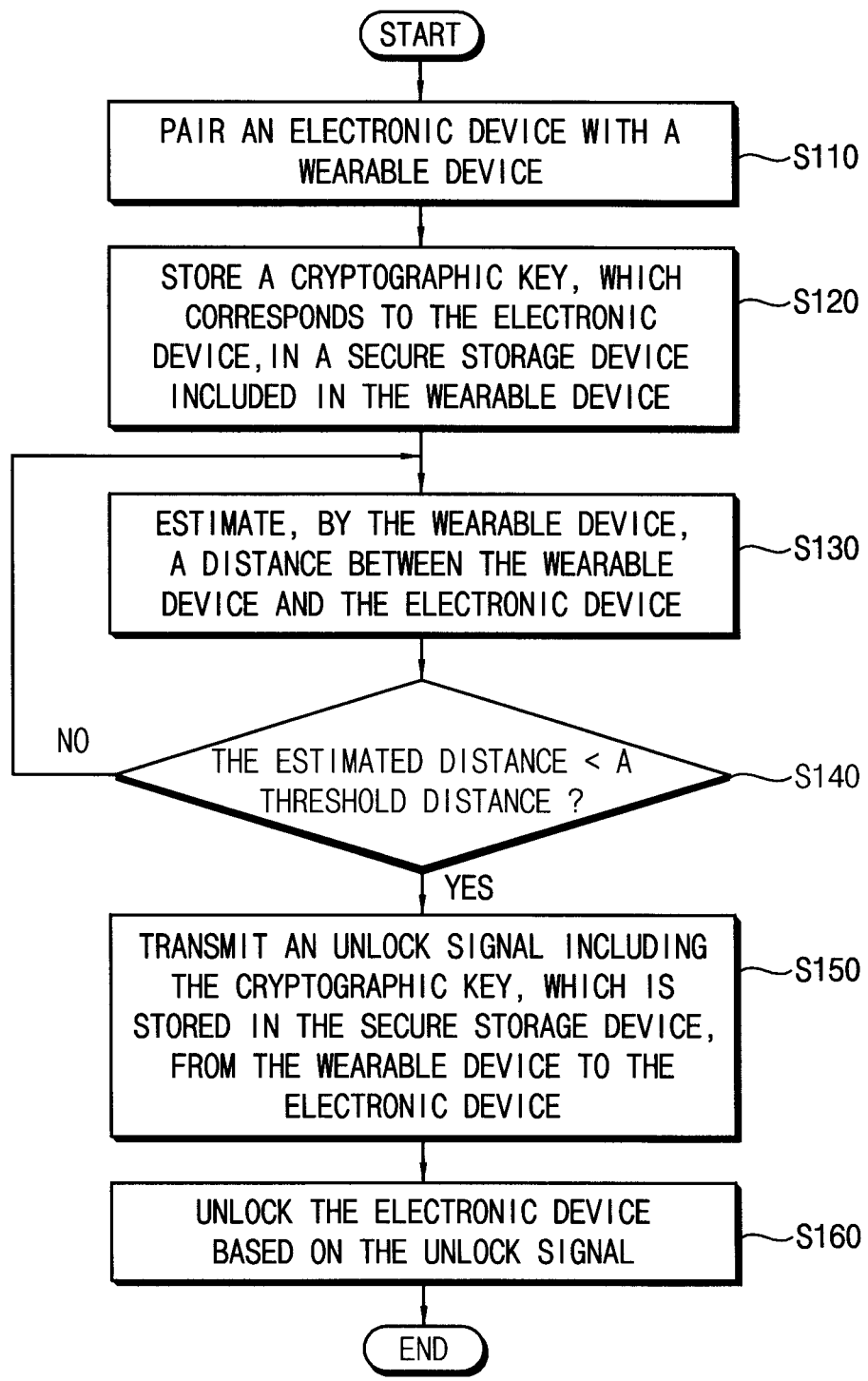
FIG. 5 is a flow chart illustrating a method of controlling an electronic device using a wearable device according to example embodiments.

FIG. 5 is a flow chart illustrating a method of controlling an electronic device using a wearable device according to example embodiments. The method of controlling an electronic device using a wearable device of FIG. 5 may be performed by the communication system 10 of FIG. 1. Hereinafter, the method of controlling the electronic device 100 using the wearable device 200 in the communication system 10 will be described with reference to FIGS. 1 to 5.

Referring to FIG. 5, in the method of controlling the electronic device 100 using the wearable device 200, the electronic device 100 is paired with the wearable device 200 (step S110). Here, the term "pair" represents establishing a unique connection between the electronic device 100 and the wearable device 200.

In some example embodiments, the electronic device 100 may be paired with the wearable device 200 using Bluetooth. In this case, the electronic device 100 and the wearable device 200 may be paired with each other by inputting a passkey, which is generated by one of the electronic device 100 and the wearable device 200, in the other one of the electronic device 100 and the wearable device 200.

When the electronic device 100 and the wearable device 200 are paired with each other successfully, the electronic device 100 may store a unique number or identifier of the wearable device 200 in the storage device 130, and the wearable device 200 may store a unique number or identifier of the electronic device 100 in the secure storage device 230. After that, when the wearable device 200 approaches the electronic device 100 such that the wearable device 200 is within a communication area of the electronic device 100, the electronic device 100 and the wearable device 200 may connect to each other automatically using the unique number or identifier of the electronic device 100 stored in the wearable device 200 and the unique number or identifier of the wearable device 200 stored in the electronic device 100 without performing the pairing operation again.

In some example embodiments, the unique number of the electronic device 100 may correspond to a media access control (MAC) address of the communication device 120, and the unique number of the wearable device 200 may correspond to a MAC address of the communication device 220.

The wearable device 200 receives a cryptographic key, which corresponds to the electronic device 100, and stores the cryptographic key in the secure storage device 230 in association with the unique number or identifier of the electronic device 100 (step S120). In some example embodiments, the wearable device 200 may receive the cryptographic key while performing the pairing operation with the electronic device 100. In other example embodiments, the wearable device 200 may receive the cryptographic key after performing the pairing operation with the electronic device 100.

As will be described later, the cryptographic key may correspond to an authentication key used by the wearable device 200 to automatically unlock the electronic device 100.

Figure 6:
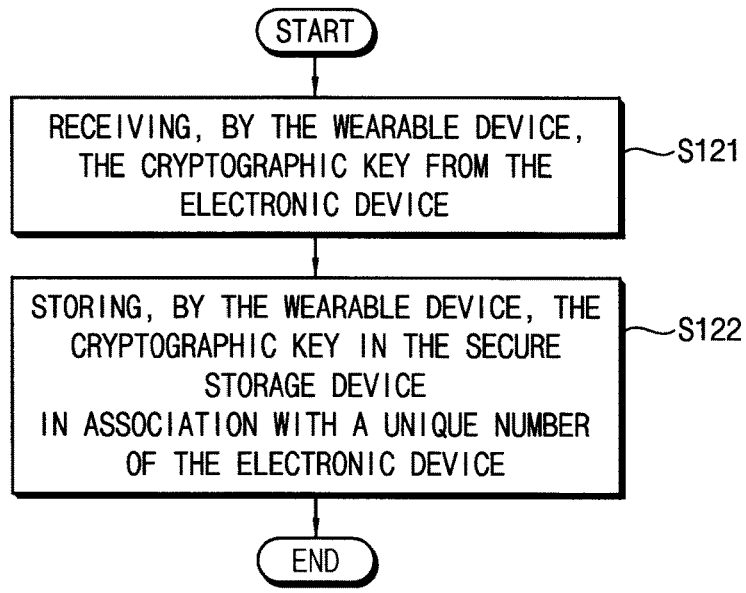
FIG. 6 is a flow chart illustrating an example of a process of storing a cryptographic key corresponding to the electronic device in a secure storage device of FIG. 5.

FIG. 6 is a flow chart illustrating an example of a process of storing a cryptographic key corresponding to the electronic device in a secure storage device (step S120) of FIG. 5. Referring to FIG. 6, the wearable device 200 may receive the cryptographic key from the electronic device 100 (step S121), and store the cryptographic key received from the electronic device 100 in the secure storage device 230 in association with the unique number or identifier of the electronic device 100 (step S122).

For example, the electronic device 100 may transmit an unlock key, which is stored in the storage device 130 and is used to unlock a lock system of the electronic device 100, to the wearable device 200 as the cryptographic key while performing the pairing operation with the wearable device 200 or after performing the pairing operation with the wearable device 200. The wearable device 200 may store the cryptographic key received from the electronic device 100 in the secure storage device 230 in association with the unique number or identifier of the electronic device 100.

Figure 7:
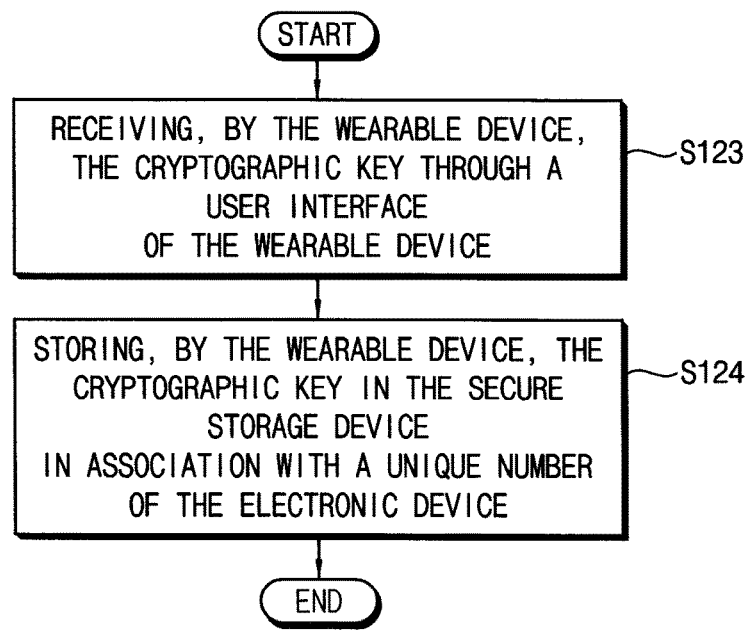
FIG. 7 is a flow chart illustrating an example of a process of storing a cryptographic key corresponding to the electronic device in a secure storage device of FIG. 5.

FIG. 7 is a flow chart illustrating an example of a process of storing a cryptographic key corresponding to the electronic device in a secure storage device (step S120) of FIG. 5. Referring to FIG. 7, the wearable device 200 may receive the cryptographic key through the user interface 240 (step S123), and store the cryptographic key received through the user interface 240 in the secure storage device 230 in association with the unique number or identifier of the electronic device 100 (step S124).

For example, the wearable device 200 may display a menu, which requests a user to input an unlock key that is used to unlock a lock system of the electronic device 100, on the display device 250 while performing the pairing operation with the electronic device 100 or after performing the pairing operation with the electronic device 100. The user interface 240 may receive the unlock key based on an input of the user and provide the unlock key to the processor 210 as the cryptographic key. The processor 210 may store the cryptographic key received from the user interface 240 in the secure storage device 230 in association with the unique number or identifier of the electronic device 100.

In some example embodiments, the wearable device 200 may store the cryptographic key in association with the unique number or identifier of the electronic device 100 in a control information table stored in the secure storage device 230.

Figure 8:
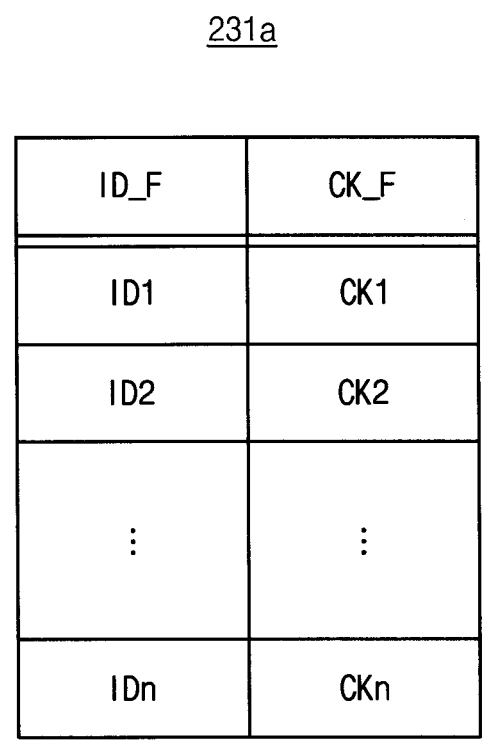

FIG. 8 is a diagram illustrating an example of a control information table stored in a secure storage device included in the wearable device of FIG. 3.

Referring to FIG. 8, a control information table 231a may include a unique number field ID_F and a cryptographic key field CK_F. The unique number field ID_F may store the unique number or identifier of the electronic device 100, and the cryptographic key field CK_F may store the cryptographic key corresponding to the electronic device 100.

As illustrated in FIG. 8, the processor 210 may store the cryptographic key corresponding to the electronic device 100 in the control information table 231a in association with the unique number or identifier of the electronic device 100.

In FIG. 8, the control information table 231a is illustrated to store first through n-th cryptographic keys CK1, CK2, . . . , CKn corresponding to first through n-th electronic devices 100 in association with first through n-th unique numbers ID1, ID2, . . . , IDn of the first through n-th electronic devices 100, respectively, as an example. Here, n represents a positive integer.

As described above, since the secure storage device 230 and the security module 270 operate on the trusted execution environment (TEE), the wearable device 200 may store the unique number or identifier of the electronic device 100 and the cryptographic key corresponding to the electronic device 100 in the secure storage device 230 safely.

After that, referring again to FIG. 5, the wearable device 200 estimates a distance between the wearable device 200 and the electronic device 100 (step S130).

Figure 9:
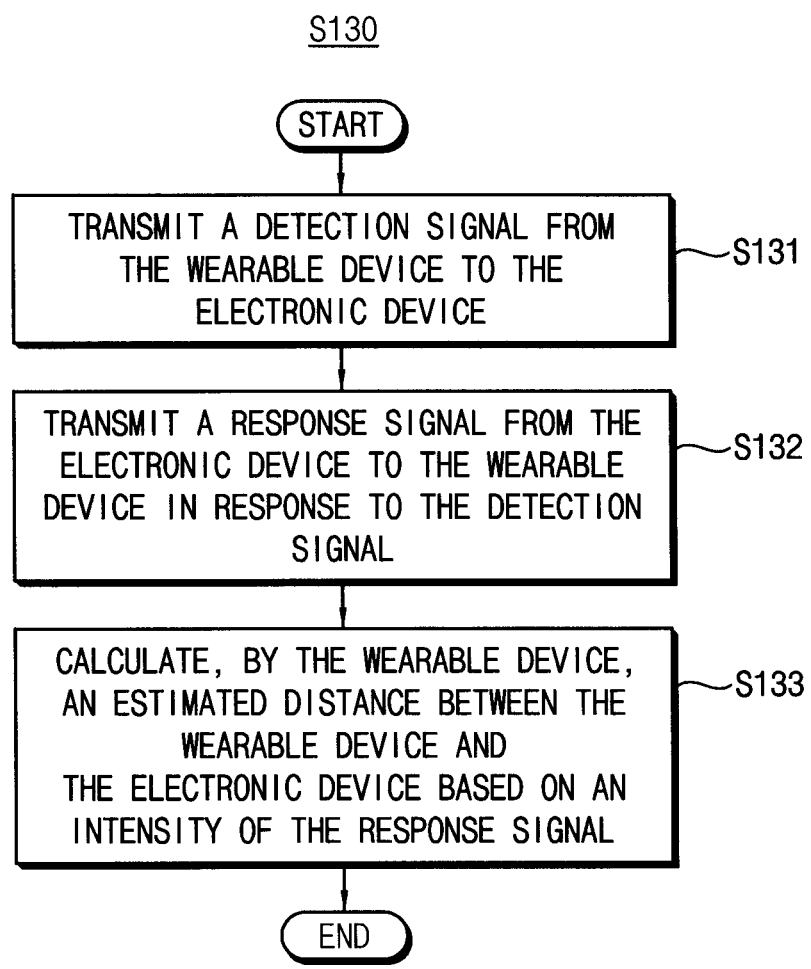
FIG. 9 is a flow chart illustrating an example of a process of estimating a distance between the wearable device and the electronic device of FIG. 5.

FIG. 9 is a flow chart illustrating an example of a process of estimating a distance between the wearable device and the electronic device (step S130) of FIG. 5. Referring to FIG. 9, the wearable device 200 transmits a detection signal to the electronic device 100 (step S131), and the electronic device 100 transmits a response signal to the wearable device 200 in response to the detection signal (step S132). An intensity of the response signal received by the wearable device 200 may be inversely proportional to the distance between the wearable device 200 and the electronic device 100. Therefore, the wearable device 200 may calculate an estimated distance based on the intensity of the response signal received from the electronic device 100 (step S133).

For example, as illustrated in FIG. 8, when the first through n-th unique numbers ID1, ID2, . . . , IDn of the first through n-th electronic devices 100 are stored in the control information table 231a included in the secure storage device 230, the wearable device 200 may transmit the detection signal to each of the first through n-th electronic devices 100, and calculate an estimated distance between the wearable device 200 and each of the first through n-th electronic devices 100 based on the intensity of the response signal received from each of the first through n-th electronic devices 100.

In some example embodiments, the wearable device 200 may transmit the detection signal to the electronic device 100 periodically. In this case, the wearable device 200 may estimate the distance between the wearable device 200 and the electronic device 100 periodically.

In other example embodiments, the wearable device 200 may transmit the detection signal to the electronic device 100 in response to a detection start signal. For example, the wearable device 200 may receive the detection start signal through the user interface 240 based on an input of the user, such as pressing an input button included in the user interface 240.

In addition, the wearable device 200 may generate the detection start signal by detecting a movement of the wearable device 200 using the sensor 260. For example, if the wearable device 200 is a smart watch, the wearable device 200 may generate the detection start signal by detecting a predetermined movement of the user wearing the wearable device 200, such as a motion of shaking a hand wearing the wearable device 200. As such, when the wearable device 200 transmits the detection signal to the electronic device 100 in response to the detection start signal, the wearable device 200 may estimate the distance between the wearable device 200 and the electronic device 100 in response to a request of the user.

Referring again to FIG. 5, the wearable device 200 compares the estimated distance between the wearable device 200 and the electronic device 100 with a threshold distance (step S140).

In some example embodiments, the threshold distance may be stored in the secure storage device 230. In this case, the wearable device 200 may determine whether the electronic device 100 is close to the wearable device 200 by comparing the estimated distance with the threshold distance stored in the secure storage device 230.

In other example embodiments, the wearable device 200 may receive the threshold distance, which is used for determining whether the electronic device 100 is close to the wearable device 200, through the user interface 240 based on an input of the user while performing the pairing operation with the electronic device 100 or after performing the pairing operation with the electronic device 100. The wearable device 200 may store the threshold distance received through the user interface 240 in the secure storage device 230 in association with the unique number or identifier of the electronic device 100. Therefore, when the wearable device 200 controls a plurality of electronic devices 100, the wearable device 200 may apply a separate threshold distance for each of the plurality of electronic devices 100.

In some example embodiments, the wearable device 200 may store the unique number or identifier of the electronic device 100, the cryptographic key corresponding to the electronic device 100 and the threshold distance corresponding to the electronic device 100 in association with each other in a control information table 231b stored in the secure storage device 230.

FIG. 10 is a diagram illustrating an example of a control information table stored in a secure storage device included in the wearable device of FIG. 3. Referring to FIG. 10, the control information table 231b may include a unique number field ID_F, a cryptographic key field CK_F and a threshold distance filed TD_F. The control information table 231b of FIG. 10 may further include the threshold distance filed TD_F from the control information table 231a of FIG. 8.

The unique number field ID_F may store the unique number or identifier of the electronic device 100, the cryptographic key field CK_F may store the cryptographic key corresponding to the electronic device 100, and the threshold distance filed TD_F may store the threshold distance corresponding to the electronic device 100.

As illustrated in FIG. 10, the processor 210 may store the unique number or identifier of the electronic device 100, the cryptographic key corresponding to the electronic device 100 and the threshold distance corresponding to the electronic device 100 in association with each other in the control information table 231b.

In FIG. 10, the control information table 231b is illustrated to store first through n-th unique numbers ID1, ID2, . . . , IDn of first through n-th electronic devices 100, first through n-th cryptographic keys CK1, CK2, . . . , CKn corresponding to the first through n-th electronic devices 100, and first through n-th threshold distances TD1, TD2, . . . , TDn corresponding to the first through n-th electronic devices 100 in association with each other as an example.

Referring again to FIG. 5, when the estimated distance between the wearable device 200 and the electronic device 100 is equal to or greater than the threshold distance corresponding to the electronic device 100 (step S140; no), the wearable device 200 estimates the distance between the wearable device 200 and the electronic device 100 again (step S130), and compares the estimated distance between the wearable device 200 and the electronic device 100 with the threshold distance corresponding to the electronic device 100 (step S140).

On the other hand, when the estimated distance between the wearable device 200 and the electronic device 100 is smaller than the threshold distance corresponding to the electronic device 100 (step S140; yes), the wearable device 200 reads the cryptographic key corresponding to the electronic device 100 from the secure storage device 230, and transmits an unlock signal including the cryptographic key to the electronic device 100 (step S150).

When the electronic device 100 receives the unlock signal from the wearable device 200, the electronic device 100 unlocks a lock system of the electronic device 100 (step S160).

Figure 11:
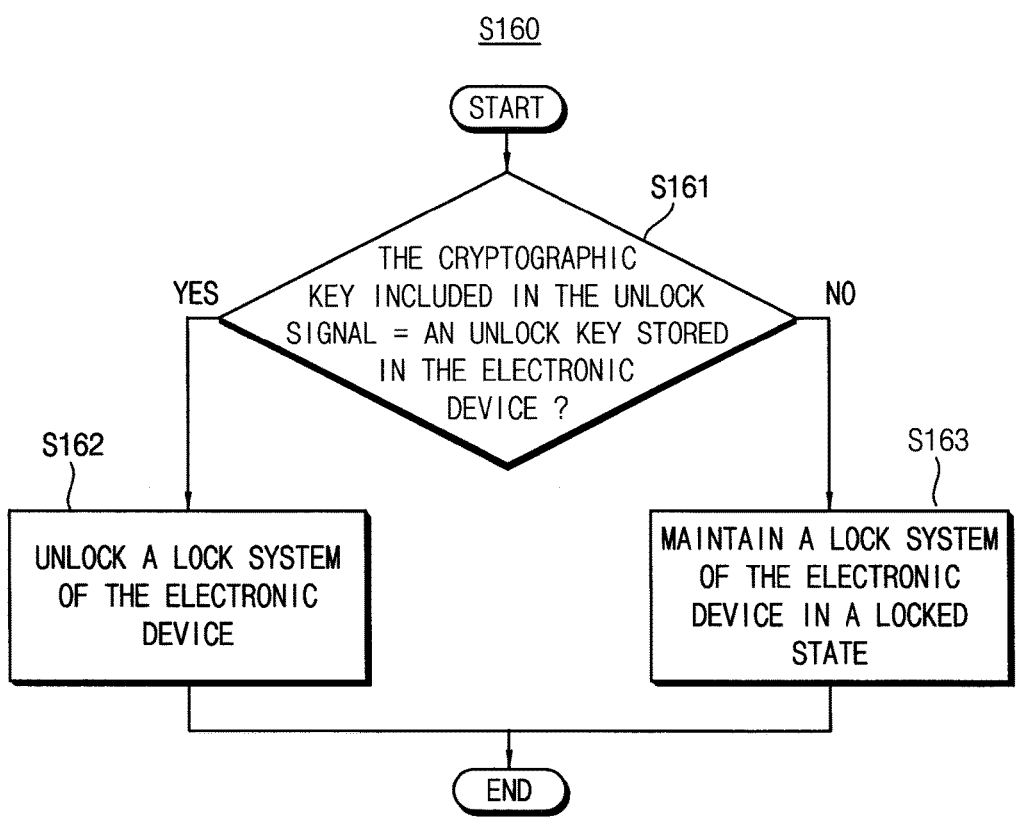
FIG. 11 is a flow chart illustrating an example of a process of unlocking the electronic device based on an unlock signal of FIG. 5.

FIG. 11 is a flow chart illustrating an example of a process of unlocking the electronic device based on an unlock signal (step S160) of FIG. 5. Referring to FIG. 11, when the electronic device 100 receives the unlock signal from the wearable device 200, the electronic device 100 may compare the cryptographic key included in the unlock signal with the unlock key, which is stored in the storage device 130 and is used to unlock the lock system of the electronic device 100 (step S161).

When the cryptographic key included in the unlock signal is identical to the unlock key stored in the storage device 130 (step S161; yes), the electronic device 100 may unlock the lock system of the electronic device 100 automatically (step S162).

When the cryptographic key included in the unlock signal is different from the unlock key stored in the storage device 130 (step S161; no), the electronic device 100 may maintain the lock system of the electronic device 100 in a locked state (step S163).

Figure 12:
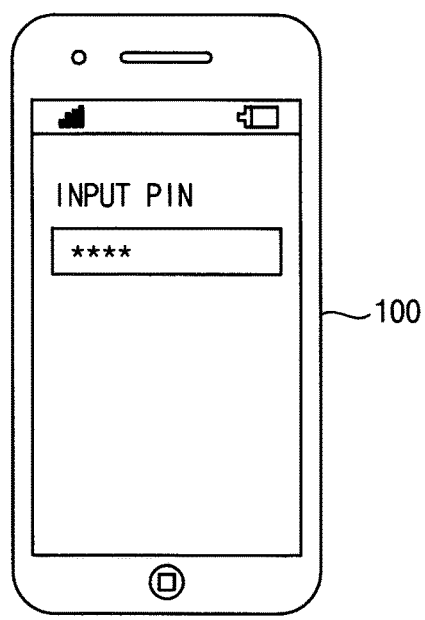
FIG. 12 is a diagram illustrating an example of the electronic device of FIG. 1 in a locked state.
Figure 13:
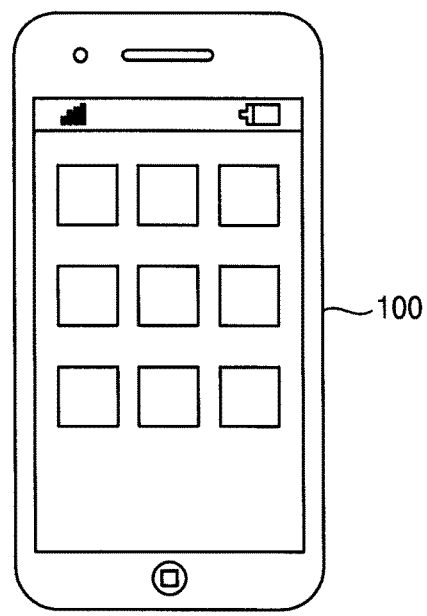
FIG. 13 is a diagram illustrating an example of the electronic device of FIG. 1 in an unlocked state.

FIG. 12 is a diagram illustrating an example of the electronic device of FIG. 1 in a locked state. FIG. 13 is a diagram illustrating an example of the electronic device of FIG. 1 in an unlocked state.

Referring to FIG. 12, when the lock system of the electronic device 100 is maintained in the locked state, the user may be required to input a personal identification number (PIN), which corresponds to the unlock key stored in the storage device 130, to unlock the lock system of the electronic device 100 before using the electronic device 100.

On the other hand, referring to FIG. 13, when the electronic device 100 unlocks the lock system of the electronic device 100 automatically based on the unlock signal received from the wearable device 200, the user may use the electronic device 100 immediately without inputting the personal identification number (PIN), which corresponds to the unlock key stored in the storage device 130.

As described above, when the wearable device 200 approaches the electronic device 100 such that the wearable device 200 is located within the threshold distance from the electronic device 100, the electronic device 100 may unlock the lock system of the electronic device 100 automatically based on the unlock signal received from the wearable device 200. Therefore, convenience of the user of the electronic device 100 may increase.

In addition, as described above, the electronic device 100 may unlock the lock system of the electronic device 100 automatically only when the cryptographic key included in the unlock signal received from the wearable device 200 is identical to the unlock key stored in the storage device 130. Since the electronic device 100 unlocks the lock system of the electronic device 100 automatically after the electronic device 100 authenticates the wearable device 200 using the unlock signal received from the wearable device 200, the electronic device 100 may be effectively prevented from being unlocked by an unauthorized device. As such, the electronic device 100 may increase convenience of the user without incurring a security problem.

In some example embodiments, the electronic device 100 may receive an automatic unlock flag through the user interface 140 based on an input of the user, and activate or deactivate an automatic unlock function based on the automatic unlock flag.

Figure 14:
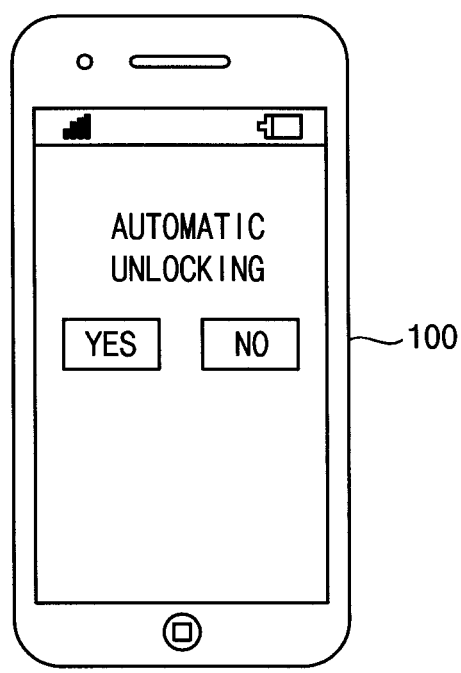
FIG. 14 is a diagram for describing a process when the electronic device of FIG. 2 receives an automatic unlock flag.

FIG. 14 is a diagram for describing a process when the electronic device of FIG. 2 receives an automatic unlock flag. As illustrated in FIG. 14, the electronic device 100 may display a menu, which requests a user to select whether to activate the automatic unlock function or deactivate the automatic unlock function, on the display device 150.

When the user selects to activate the automatic unlock function, the user interface 140 may generate the automatic unlock flag having a first value, and the processor 110 may store the automatic unlock flag having the first value in the storage device 130. When the user selects to deactivate the automatic unlock function, the user interface 140 may generate the automatic unlock flag having a second value, and the processor 110 may store the automatic unlock flag having the second value in the storage device 130.

When the electronic device 100 receives the unlock signal from the wearable device 200, the electronic device 100 may determine a value of the automatic unlock flag. When the automatic unlock flag has the first value, the electronic device 100 may unlock the lock system of the electronic device 100 based on the cryptographic key included in the unlock signal and the unlock key stored in the storage device 130. When the automatic unlock flag has the second value, the electronic device 100 may maintain the lock system of the electronic device 100 in the locked state regardless of the unlock signal.

As described above, the electronic device 100 may selectively activate the automatic unlock function, which is used with the wearable device 200, based on a choice of the user.

In some example embodiments, when the estimated distance between the wearable device 200 and the electronic device 100 is smaller than the threshold distance corresponding to the electronic device 100 (step S140; yes), the wearable device 200 may determine whether a current user wearing the wearable device 200 is an authorized user of the electronic device 100 and the wearable device 200 before transmitting the unlock signal to the electronic device 100. When the wearable device 200 determines that the current user wearing the wearable device 200 is an authorized user of the electronic device 100, the wearable device 200 may transmit the unlock signal to the electronic device 100. When the wearable device 200 determines that the current user wearing the wearable device 200 is an unauthorized user of the electronic device 100, the wearable device 200 may not transmit the unlock signal to the electronic device 100.

Figure 15:
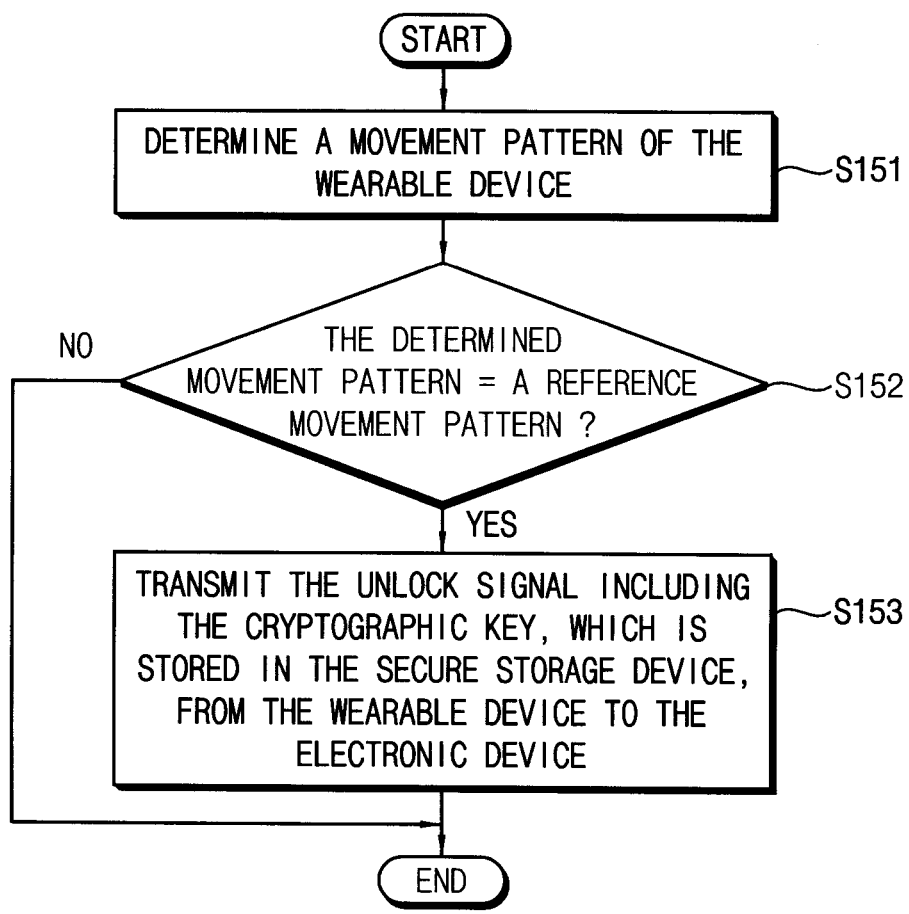
FIG. 15 is a flow chart illustrating an example of a process of transmitting an unlock signal from the wearable device to the electronic device of FIG. 5.

FIG. 15 is a flow chart illustrating an example of a process of transmitting an unlock signal from the wearable device to the electronic device (step S150) of FIG. 5. Referring to FIG. 15, when the estimated distance between the wearable device 200 and the electronic device 100 is smaller than the threshold distance corresponding to the electronic device 100 (step S140; yes), the wearable device 200 may determine a movement pattern of the wearable device 200 using the sensor 260 (step S151). The wearable device 200 may compare the determined movement pattern with a reference movement pattern, which is stored in the secure storage device 230 (step S152).

For example, since a swing speed and/or a swing angle of an arm while walking is different from individual to individual, the movement pattern of the wearable device 200 may be determined based on a person wearing the wearable device 200. Therefore, the wearable device 200 may detect a movement pattern of the wearable device 200 using the sensor 260 while an authorized user of the wearable device 200 and the electronic device 100 wears the wearable device 200, and prestore the detected movement pattern in the secure storage device 230 as the reference movement pattern.

When the determined movement pattern is substantially identical to or otherwise matches the reference movement pattern stored in the secure storage device 230 (step S152; yes), the wearable device 200 may determine that the current user wearing the wearable device 200 is an authorized user of the wearable device 200 and the electronic device 100. In this case, the wearable device 200 may read the cryptographic key corresponding to the electronic device 100 from the secure storage device 230, and transmit the unlock signal including the cryptographic key to the electronic device 100 (step S153).

When the determined movement pattern is different from the reference movement pattern stored in the secure storage device 230 (step S152; no), the wearable device 200 may determine that the current user wearing the wearable device 200 is not an authorized user of the wearable device 200 and the electronic device 100. In this case, the wearable device 200 may not transmit the unlock signal to the electronic device 100.

Figure 16:
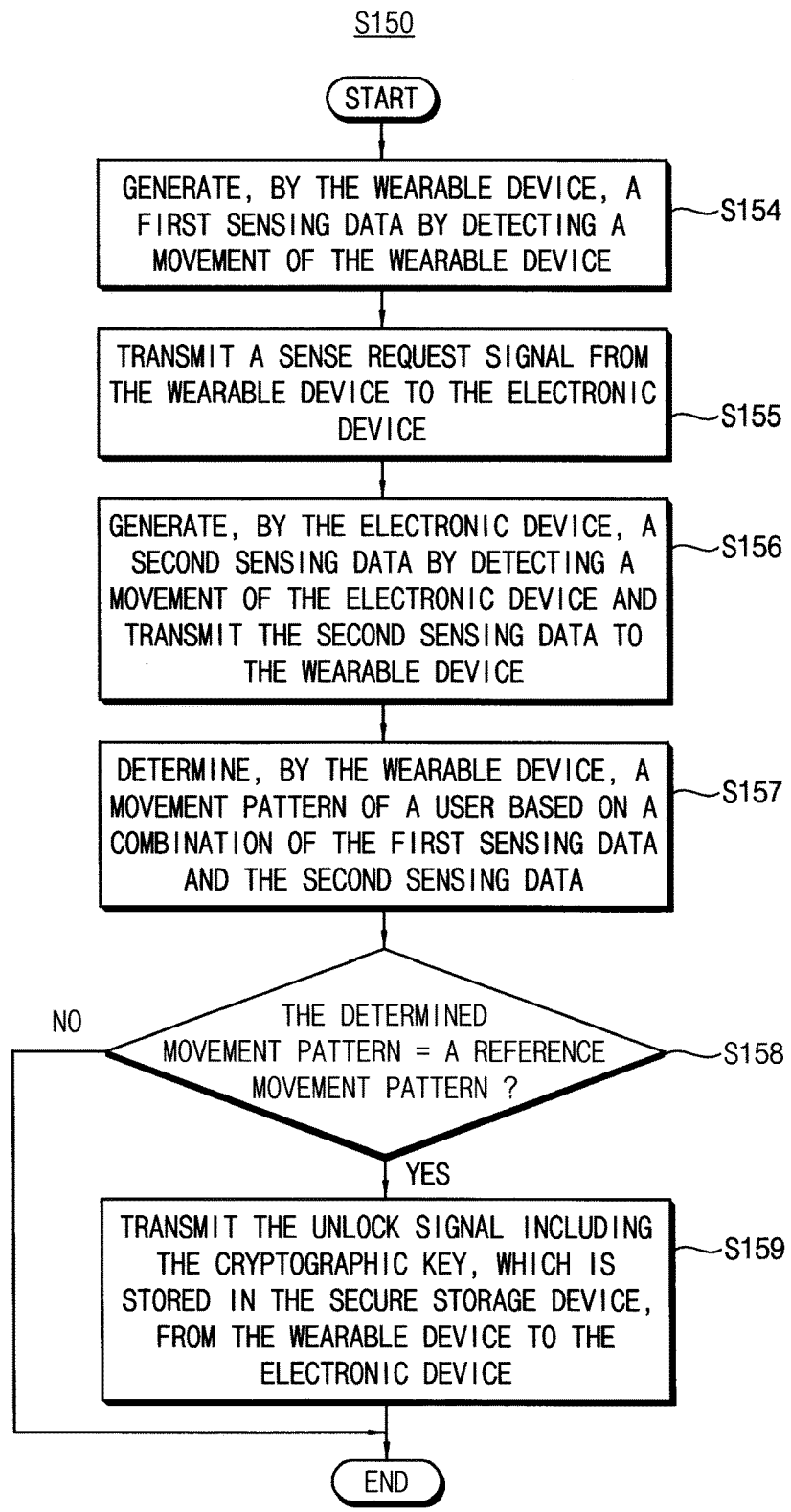
FIG. 16 is a flow chart illustrating an example of a process of transmitting an unlock signal from the wearable device to the electronic device of FIG. 5.

FIG. 16 is a flow chart illustrating an example of a process of transmitting an unlock signal from the wearable device to the electronic device (step S150) of FIG. 5. Referring to FIG. 16, when the estimated distance between the wearable device 200 and the electronic device 100 is smaller than the threshold distance corresponding to the electronic device 100 (step S140; yes), the wearable device 200 may generate a first sensing data by detecting a movement of the wearable device 200 using the sensor 260 (step S154). The wearable device 200 may transmit a sense request signal to the electronic device 100 (step S155). The electronic device 100 may generate a second sensing data in response to the sense request signal by detecting a movement of the electronic device 100 using the sensor 160, and transmit the second sensing data to the wearable device 200 (step S156).

The wearable device 200 may determine a movement pattern of a current user based on a combination of the first sensing data and the second sensing data (step S157). The wearable device 200 may compare the determined movement pattern with a reference movement pattern, which is stored in the secure storage device 230 (step S158).

When the determined movement pattern is substantially identical to the reference movement pattern stored in the secure storage device 230 (step S158; yes), the wearable device 200 may determine that the current user wearing the wearable device 200 is an authorized user of the wearable device 200 and the electronic device 100. In this case, the wearable device 200 may read the cryptographic key corresponding to the electronic device 100 from the secure storage device 230, and transmit the unlock signal including the cryptographic key to the electronic device 100 (step S159).

When the determined movement pattern is different from the reference movement pattern stored in the secure storage device 230 (step S158; no), the wearable device 200 may determine that the current user wearing the wearable device 200 is not an authorized user of the wearable device 200 and the electronic device 100. In this case, the wearable device 200 may not transmit the unlock signal to the electronic device 100.

Figure 17:
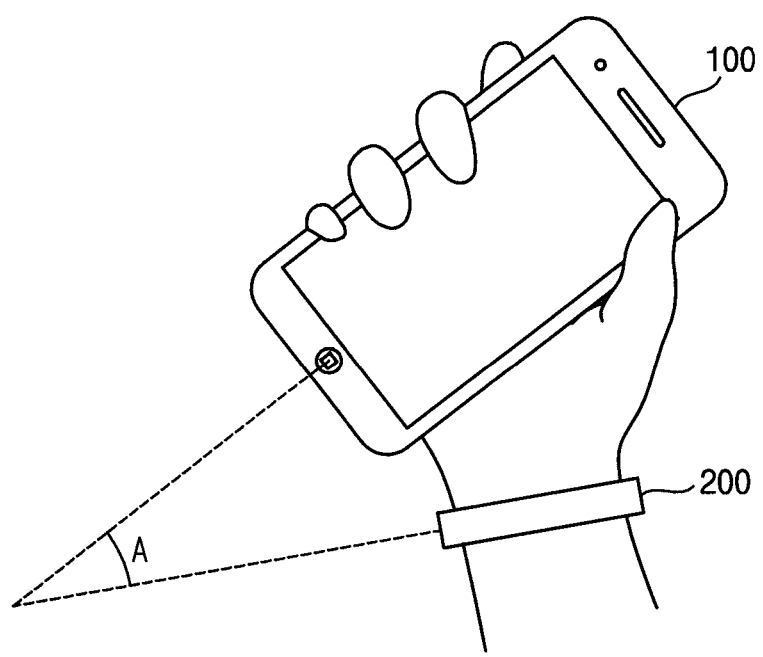
FIG. 17 is a diagram for describing an example of a process of FIG. 16.

FIG. 17 is a diagram for describing an example of a process of FIG. 16. In FIG. 17, the electronic device 100 is illustrated as a smart phone, and the wearable device 200 is illustrated as a smart watch as an example.

As illustrated in FIG. 17, when a user holds the electronic device 100 with a hand wearing the wearable device 200, an angle A between the electronic device 100 and the wearable device 200 may be different from individual to individual. Therefore, a difference angle A between an angle of the electronic device 100 relative to a horizontal plane and an angle of the wearable device 200 relative to the horizontal plane may be determined based on a person wearing the wearable device 200 and holding the electronic device 100.

Therefore, the wearable device 200 may determine the difference angle A between an angle of the electronic device 100 relative to the horizontal plane, which is detected by the sensor 160, and an angle of the wearable device 200 relative to the horizontal plane, which is detected by the sensor 260, while an authorized user of the wearable device 200 and the electronic device 100 wears the wearable device 200 and holds the electronic device 100, and prestore the determined difference angle A in the secure storage device 230 as the reference movement pattern.

In this case, when the estimated distance between the wearable device 200 and the electronic device 100 is smaller than the threshold distance corresponding to the electronic device 100 (step S140; yes), the wearable device 200 may detect an angle of the wearable device 200 relative to the horizontal plane using the sensor 260 and determine the detected angle as the first sensing data (step S154). The wearable device 200 may transmit the sense request signal to the electronic device 100 (step S155). The electronic device 100 may detect an angle of the electronic device 100 relative to the horizontal plane using the sensor 160 and transmit the detected angle to the wearable device 200 as the second sensing data (step S156). The wearable device 200 may determine a difference between the first sensing data and the second sensing data as the movement pattern of a current user (step S157).

When the determined movement pattern is substantially identical to or otherwise matches the reference movement pattern stored in the secure storage device 230 (step S158; yes), the wearable device 200 may determine that the current user wearing the wearable device 200 is an authorized user of the wearable device 200 and the electronic device 100. In this case, the wearable device 200 may read the cryptographic key corresponding to the electronic device 100 from the secure storage device 230, and transmit the unlock signal including the cryptographic key to the electronic device 100 (step S159).

When the determined movement pattern is different from the reference movement pattern stored in the secure storage device 230 (step S158; no), the wearable device 200 may determine that the current user wearing the wearable device 200 is not an authorized user of the wearable device 200 and the electronic device 100. In this case, the wearable device 200 may not transmit the unlock signal to the electronic device 100.

In FIG. 17, the angle A between the electronic device 100 and the wearable device 200 is regarded as the movement pattern of the current user as an example. However, embodiments are not limited thereto, and the movement pattern of the current user may be determined based on any combination of the first sensing data, which is generated by the sensor 260 included in the wearable device 200, and the second sensing data, which is generated by the sensor 160 included in the electronic device 100. For example, a combination of the angle A between the electronic device 100 and the wearable device 200 and an acceleration of the electronic device 100 and the wearable device 200 may be used to determine the movement pattern of the current user.

As described above with reference to FIGS. 15, 16 and 17, when the estimated distance between the wearable device 200 and the electronic device 100 is smaller than the threshold distance corresponding to the electronic device 100 (step S140; yes), the wearable device 200 may determine whether a current user wearing the wearable device 200 is an authorized user of the electronic device 100 and the wearable device 200 before transmitting the unlock signal to the electronic device 100, and transmit the unlock signal to the electronic device 100 when the wearable device 200 determines that the current user wearing the wearable device 200 is an authorized user of the electronic device 100 and the wearable device 200. Therefore, a security level of the electronic device 100 may further increase.

Figure 18B:
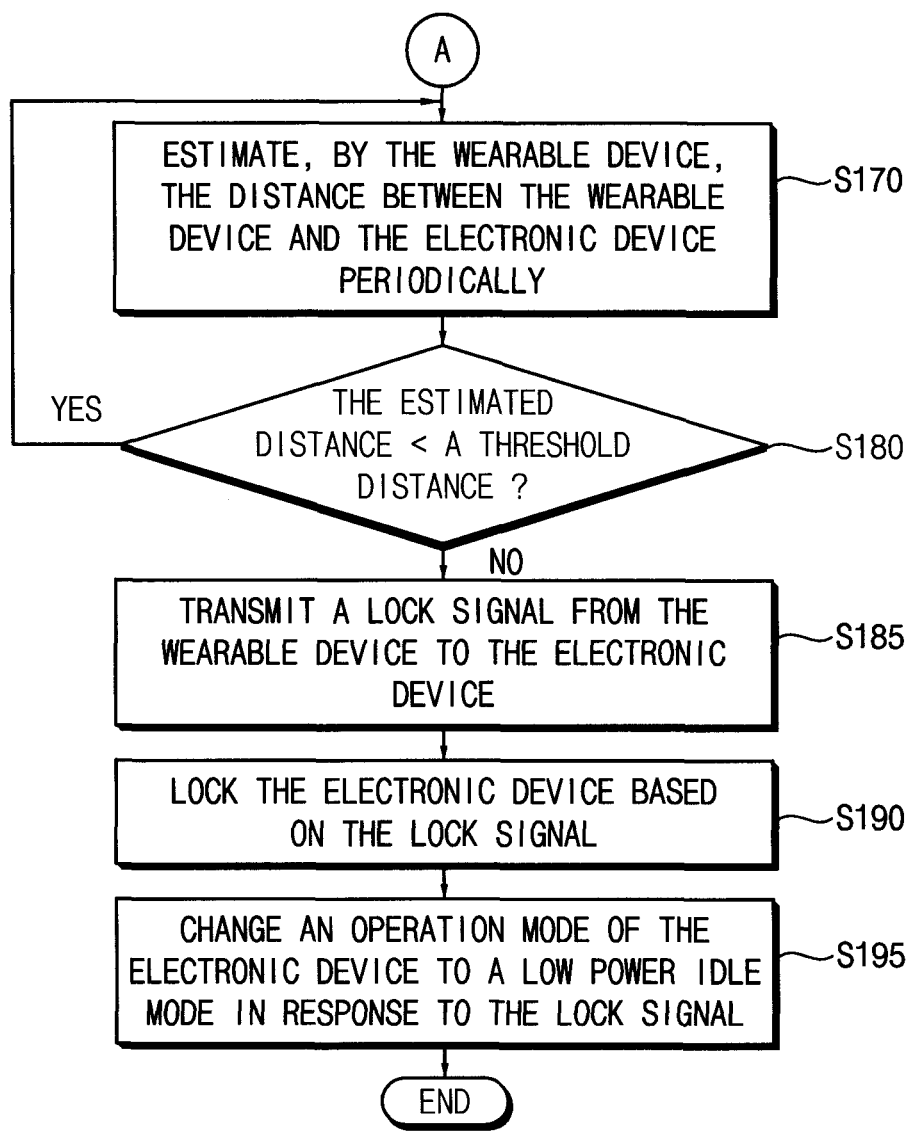

FIGS. 18A and 18B are a flow chart illustrating a method of controlling an electronic device using a wearable device according to example embodiments. The method of controlling an electronic device using a wearable device of FIGS. 18A and 18B further includes steps S170, S180, S185, S190 and S195 from the method of controlling an electronic device using a wearable device of FIG. 5.

Referring to FIGS. 18A and 18B, after the wearable device 200 transmits the unlock signal to the electronic device 100 (step S150), the wearable device 200 may estimate the distance between the wearable device 200 and the electronic device 100 periodically (step S170), and compare the estimated distance between the wearable device 200 and the electronic device 100 with the threshold distance corresponding to the electronic device 100, which is stored in the secure storage device 230 (step S180).

When the estimated distance between the wearable device 200 and the electronic device 100 is smaller than the threshold distance corresponding to the electronic device 100 (step S180; yes), the wearable device 200 may estimate the distance between the wearable device 200 and the electronic device 100 again (step S170), and compare the estimated distance between the wearable device 200 and the electronic device 100 with the threshold distance corresponding to the electronic device 100 (step S180).

When the estimated distance between the wearable device 200 and the electronic device 100 is equal to or greater than the threshold distance corresponding to the electronic device 100 (step S180; no), the wearable device 200 may determine that the electronic device 100 is out of the control of a user, and transmit a lock signal to the electronic device 100 (step S185).

When the electronic device 100 receives the lock signal from the wearable device 200, the electronic device 100 may lock the lock system of the electronic device 100 based on the lock signal (step S190).

In some example embodiments, the wearable device 200 may read the cryptographic key corresponding to the electronic device 100 from the secure storage device 230, and transmit the lock signal including the cryptographic key to the electronic device 100. In this case, the electronic device 100 may compare the cryptographic key included in the lock signal with the unlock key, which is stored in the storage device 130, and lock the lock system of the electronic device 100 when the cryptographic key included in the lock signal is identical to the unlock key stored in the storage device 130.

As described above, when the wearable device 200 approaches the electronic device 100 such that the wearable device 200 is located within the threshold distance from the electronic device 100, the electronic device 100 may unlock the lock system of the electronic device 100 automatically based on the unlock signal received from the wearable device 200. In addition, when the wearable device 200 recedes from the electronic device 100 such that the wearable device 200 is located further than the threshold distance from the electronic device 100, the electronic device 100 may lock the lock system of the electronic device 100 automatically based on the lock signal received from the wearable device 200. Therefore, a security level of the electronic device 100 may further increase.

In some example embodiments, when the electronic device 100 receives the lock signal from the wearable device 200, the electronic device 100 may change an operation mode of the electronic device 100 to a low power idle mode based on the lock signal (step S195). For example, when the electronic device 100 receives the lock signal from the wearable device 200, the electronic device 100 may turn off the display device 150 and decrease a frequency of a clock signal used by the processor 110 to reduce power consumption of the electronic device 100.

In some example embodiments, when the electronic device 100 connects to a website that is registered in the wearable device 200, the electronic device 100 may log on to the website automatically using a user name and a password, which are received from the wearable device 200. For example, the electronic device 100 may store addresses of websites, which are registered in the wearable device 200, in the storage device 130 as an address table.

FIG. 19 is a diagram illustrating an example of an address table stored in a storage device included in the electronic device of FIG. 2. Referring to FIG. 19, an address table 131 may include an address field ADDR_F. The address field ADDR_F may store addresses of websites that are registered in the wearable device 200.

In FIG. 19, the address table 131 is illustrated to store m addresses ADDR1, ADDR2, . . . , ADDRm corresponding to m websites, respectively, as an example. Here, m represents a positive integer.

When the electronic device 100 connects to a website corresponding to a first address, the electronic device 100 may determine whether the first address is stored in the address table 131, which is stored in the storage device 130.

When the first address is not stored in the address table 131, the electronic device 100 may require a user to input a user name and a password, receive the user name and the password through the user interface 140 based on an input of the user, and log on to the website corresponding to the first address using the user name and the password, which are received through the user interface 140.

In addition, the electronic device 100 may display a menu, which requests the user to select whether to store the first address, the user name and the password corresponding to the website in the wearable device 200, on the display device 150. When the user selects to store the first address, the user name and the password in the wearable device 200, the electronic device 100 may transmit the user name and the password, which are received through the user interface 140, together with the first address to the wearable device 200, and store the first address in the address table 131.

The wearable device 200 may store the first address, the user name and the password, which are received from the electronic device 100, in the secure storage device 230 in association with the unique number or identifier of the electronic device 100.

For example, the wearable device 200 may store the first address, the user name and the password in association with the unique number or identifier of the electronic device 100 in the secure storage device 230 as a log on information table.

FIG. 20 is a diagram illustrating an example of a log on information table stored in a secure storage device included in the wearable device of FIG. 3. Referring to FIG. 20, a log on information table 232 may include a unique number field ID_F, an address field ADDR_F, a user name field UN_F and a password field PW_F.

The unique number field ID_F may store the unique number or identifier of the electronic device 100, the address field ADDR_F may store the first address received from the electronic device 100, the user name field UN_F may store the user name received from the electronic device 100, and the password field PW_F may store the password received from the electronic device 100.

As illustrated in FIG. 20, the processor 210 may store the first address, the user name and the password, which are received from the electronic device 100, in the log on information table 232 in association with the unique number or identifier of the electronic device 100.

As illustrated in FIG. 20, the log on information table 232 may store a plurality of groups of the first address, the user name and the password for each of the plurality of electronic devices 100.

Referring again to FIG. 19, when the electronic device 100 connects to a website corresponding to a first address, the electronic device 100 may determine whether the first address is stored in the address table 131, which is stored in the storage device 130. When the first address is stored in the address table 131, the electronic device 100 may transmit the first address to the wearable device 200.

When the wearable device 200 receives the first address from the electronic device 100, the wearable device 200 may estimate a distance between the wearable device 200 and the electronic device 100, and compare the estimated distance between the wearable device 200 and the electronic device 100 with the threshold distance corresponding to the electronic device 100, which is stored in the secure storage device 230. When the estimated distance between the wearable device 200 and the electronic device 100 is smaller than the threshold distance corresponding to the electronic device 100, the wearable device 200 may read the user name and the password, which correspond to the first address, from the log on information table 232 stored in the secure storage device 230, and transmit the user name and the password to the electronic device 100.

The electronic device 100 may log on to the website corresponding to the first address automatically using the user name and the password received from the wearable device 200.

As described above, the electronic device 100 may selectively store the first address, the user name and the password corresponding to the website in the wearable device 200 based on a choice of the user. When the electronic device 100 connects to the website corresponding to the first address after the electronic device 100 stores the first address, the user name and the password corresponding to the website in the wearable device 200, the electronic device 100 may log on to the website corresponding to the first address automatically using the user name and the password received from the wearable device 200. Therefore, convenience of the user of the electronic device 100 may increase.

When the electronic device 100 receives the lock signal from the wearable device 200 after the electronic device 100 logs on to the website corresponding to the first address automatically using the user name and the password received from the wearable device 200, the electronic device 100 may determine that the electronic device 100 gets out of control of the user wearing the wearable device 200, and log off from the website corresponding to the first address automatically. Therefore, a security level of the electronic device 100 may increase.

The electronic device 100 is described as a mobile device with reference to FIGS. 1 to 20. However, embodiments are not limited thereto. In some example embodiments, the electronic device 100 may be a home appliance. For example, the electronic device 100 may be a home appliance that is dangerous for children, such as a kitchen stove, a microwave oven, a cook top, a grinder, a crusher, etc. In this case, when an authorized user wearing the wearable device 200, such as a parent, approaches the electronic device 100, the electronic device 100 may unlock the lock system of the electronic device 100 automatically based on the unlock signal received from the wearable device 200. In addition, when the authorized user wearing the wearable device 200 recedes from the electronic device 100, the electronic device 100 may lock the lock system of the electronic device 100 automatically based on the lock signal received from the wearable device 200. Therefore, convenience of the user of the electronic device 100 may increase while preventing children from using the electronic device 100 without a guidance of the user.

Figure 21:
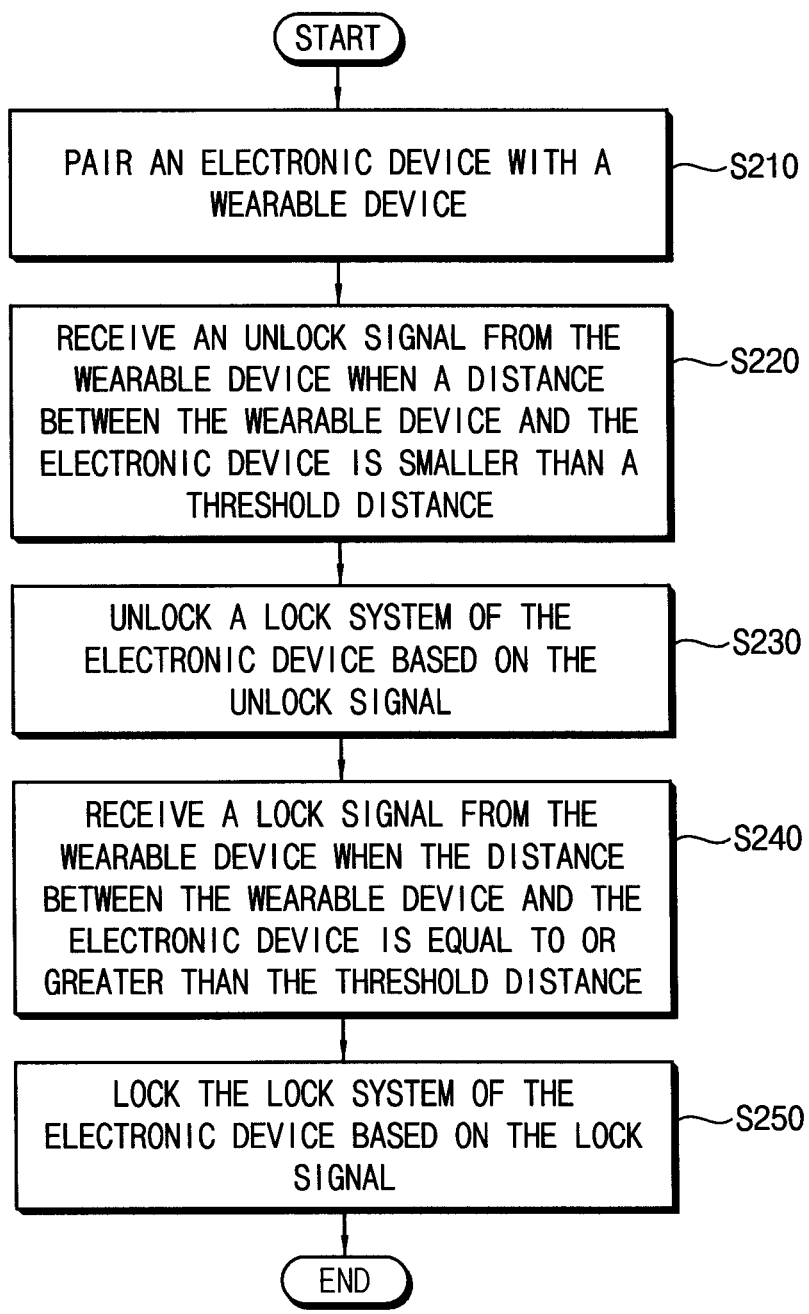
FIG. 21 is a flow chart illustrating a method of operating an electronic device according to example embodiments.

FIG. 21 is a flow chart illustrating a method of operating an electronic device according to example embodiments. Referring to FIG. 21, an electronic device is paired with a wearable device (step S210).

After that, when a distance between the wearable device and the electronic device becomes smaller than a threshold distance, the electronic device receives an unlock signal from the wearable device (step S220). The electronic device unlocks a lock system of the electronic device based on the unlock signal received from the wearable device (step S230).

After that, when the distance between the wearable device and the electronic device becomes equal to or greater than the threshold distance, the electronic device receives a lock signal from the wearable device (step S240). The electronic device locks the lock system of the electronic device based on the lock signal received from the wearable device (step S250).

As described above, when the wearable device approaches the electronic device such that the wearable device is located within the threshold distance from the electronic device, the electronic device may unlock the lock system of the electronic device automatically based on the unlock signal received from the wearable device. Therefore, convenience of the user of the electronic device may increase. In addition, when the wearable device recedes from the electronic device such that the wearable device is located further than the threshold distance from the electronic device, the electronic device may lock the lock system of the electronic device automatically based on the lock signal received from the wearable device. Therefore, a security level of the electronic device may increase.

The method of operating an electronic device of FIG. 21 may be performed by the electronic device 100 and the wearable device 200 included in the communication system 10 of FIG. 1. A structure and an operation of the electronic device 100 and the wearable device 200 included in the communication system 10 are described above with reference to FIGS. 1 to 20. Therefore, duplicated description about the method of operating an electronic device of FIG. 21 will be omitted here.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of controlling an electronic device using a wearable device, comprising:
    pairing, by the wearable device, the electronic device with the wearable device;
    receiving, by the wearable device, a cryptographic key from the electronic device;
    storing the cryptographic key in a secure storage device included in the wearable device;
    estimating, by the wearable device and subsequent to the pairing, a distance between the wearable device and the electronic device as an estimated distance by transmitting a detection signal to the electronic device, receiving a response signal transmitted from the electronic device in response to the detection signal, and calculating the estimated distance based on an intensity of the response signal; and
    automatically transmitting an unlock signal including the cryptographic key, which is stored in the secure storage device, from the wearable device to the electronic device when the estimated distance is closer than a threshold distance,
    wherein the electronic device is automatically unlocked based on the unlock signal including the cryptographic key, and
    wherein the unlock signal is independent from user input to the electronic device.

2. The method of claim 1, wherein storing the cryptographic key, which corresponds to the electronic device, in the secure storage device included in the wearable device is performed prior to the estimating and includes:
    receiving, by the wearable device, the cryptographic key from the electronic device; and
    storing, by the wearable device, the cryptographic key in the secure storage device in association with a distinctive identifier of the electronic device.

3. The method of claim 1, wherein storing the cryptographic key, which corresponds to the electronic device, in the secure storage device included in the wearable device includes:
    receiving, by the wearable device, the cryptographic key through a user interface of the wearable device; and
    storing, by the wearable device, the cryptographic key in the secure storage device in association with a distinctive identifier of the electronic device.

4. The method of claim 1,
    wherein the secure storage device of the wearable device is only accessed by a predetermined application operating on a trusted execution environment (TEE) on the wearable device.

5. The method of claim 1, wherein unlocking the electronic device based on the unlock signal includes:
    automatically transmitting the unlock signal from the wearable device to the electronic device when the estimated distance is closer than the threshold distance;
    comparing, by the electronic device, the cryptographic key included in the unlock signal with an unlock key stored in the electronic device; and
    unlocking, by the electronic device, a lock system of the electronic device when the cryptographic key included in the unlock signal matches the unlock key stored in the electronic device without receiving user input.

6. The method of claim 1, wherein the wearable device receives the threshold distance through a user interface of the wearable device, and stores the threshold distance in the secure storage device in association with a distinctive identifier of the electronic device.

7. The method of claim 1, wherein the electronic device receives an automatic unlock flag through a user interface of the electronic device, and internally stores the automatic unlock flag; and
    when the electronic device receives the unlock signal from the wearable device, the electronic device unlocks a lock system of the electronic device based on the unlock signal if the automatic unlock flag has a first value, and maintains the lock system of the electronic device in a locked state if the automatic unlock flag has a second value.

8. The method of claim 1, further comprising:
    estimating, by the wearable device, the distance between the wearable device and the electronic device periodically after the wearable device transmits the unlock signal to the electronic device;
    transmitting a lock signal from the wearable device to the electronic device when the estimated distance is not less than the threshold distance; and
    locking the electronic device based on the lock signal.

9. The method of claim 8, further comprising:
    connecting, by the electronic device, to a website corresponding to a first address;
    determining, by the electronic device, whether the first address is stored in an address table, which is internally stored in the electronic device; and
    logging on, by the electronic device, to the website corresponding to the first address automatically using a user name and a password, which are received from the wearable device, when the first address is stored in the address table.

10. The method of claim 1, wherein transmitting the unlock signal including the cryptographic key, which is stored in the secure storage device, from the wearable device to the electronic device when the estimated distance is smaller than the threshold distance includes:
    determining, by the wearable device, a movement pattern of the wearable device using a sensor included in the wearable device as a determined movement pattern; and
    transmitting the unlock signal including the cryptographic key, which is stored in the secure storage device, from the wearable device to the electronic device based on a reference movement pattern, which is stored in the secure storage device, and the determined movement pattern.

11. The method of claim 1, wherein transmitting the unlock signal including the cryptographic key, which is stored in the secure storage device, from the wearable device to the electronic device when the estimated distance is smaller than the threshold distance includes:

generating, by the wearable device, a first sensing data by detecting a movement of the wearable device using a sensor included in the wearable device;

transmitting a sense request signal from the wearable device to the electronic device;

generating, by the electronic device, a second sensing data in response to the sense request signal by detecting a movement of the electronic device using a sensor included in the electronic device;

transmitting the second sensing data from the electronic device to the wearable device;

determining, by the wearable device, a movement pattern of a user based on a combination of the first sensing data and the second sensing data as a determined movement pattern; and transmitting the unlock signal including the cryptographic key, which is stored in the secure storage device, from the wearable device to the electronic device based on a reference movement pattern, which is stored in the secure storage device, and the determined movement pattern.

12. A method of operating an electronic device, comprising:

pairing, by a wearable device, the electronic device with wearable device; and receiving an unlock signal automatically transmitted from the wearable device subsequent to the pairing based on the wearable device estimating a distance between the wearable device and the electronic device to be closer than a threshold distance, the unlock signal including a cryptographic key that is received and stored by the wearable device in a secure storage based on the pairing, wherein the distance between the wearable device and the electronic device is estimated based on an intensity of a response signal transmitted from the electronic device to the wearable device in response to a detection signal received by the electronic device from the wearable device, wherein a lock system of the electronic device is automatically unlocked based on the unlock signal including the cryptographic key and independent from user input to the electronic device after the cryptographic key is stored in the secure storage included in the wearable device.

13. A wearable device for controlling a paired electronic device, the wearable device comprising:

a communication device;

a secure storage device configured to receive and store a cryptographic key which corresponds to the electronic device, based on the wearable device pairing with the electronic device; and a processor configured to, in combination with the communication device and the secure storage device, estimate a distance between the wearable device and the electronic device subsequent to the pairing, and transmit an unlock signal including the cryptographic key, which is stored in the secure storage device, from the wearable device to the electronic device in response to the wearable device estimating the estimated distance to be closer than a threshold distance, to automatically unlock the electronic device based on the unlock signal including the cryptographic key and independent from user input to the electronic device after the cryptographic key is stored in the secure storage included in the wearable device, wherein the distance between the wearable device and the electronic device is estimated based on an intensity of a response signal received by the wearable device from the electronic device in response to the wearable device transmitting a detection signal to the electronic device.

14. The wearable device of claim 13, wherein the processor is configured to, in combination with the communication device and the secure storage device, receive the cryptographic key from the electronic device and store the cryptographic key in the secure storage device in association with a distinctive identifier of the electronic device and prior to the processor estimating the distance.

15. The wearable device of claim 13, further comprising a user interface;

wherein the processor is configured to, in combination with the communication device and the secure storage device, receive the cryptographic key through the user interface of the wearable device, and store the cryptographic key in the secure storage device in association with a distinctive identifier of the electronic device.

16. The wearable device of claim 13, wherein the processor is configured to, in combination with the secure storage device, operate a trusted execution environment (TEE); and wherein the secure storage device is only accessed by a predetermined application operating on the TEE on the wearable device.

17. The wearable device of claim 13, wherein the secure storage device is configured to store the threshold distance.

18. The wearable device of claim 13, wherein the processor is configured to, in combination with the communication device and the secure storage device:

estimate the distance between the wearable device and the electronic device periodically after transmitting the unlock signal to the electronic device;

and transmit a lock signal to the electronic device when the estimated distance is not less than the threshold distance to lock the electronic device.

19. The wearable device of claim 13, wherein the processor is configured to, in combination with the communication device and the secure storage device, receive a first address from the electronic device, and transmit a user name and password, to the electronic device, for logging on to a website corresponding to the first address stored.

* * * * *